United States Patent
Yvin et al.

(10) Patent No.: US 11,440,855 B2
(45) Date of Patent: Sep. 13, 2022

(54) USE OF PHYCOBILIPROTEINS OR AN EXTRACT CONTAINING SAME AS FERTILIZER

(71) Applicant: AGRO INNOVATION INTERNATIONAL, Saint-Malo (FR)

(72) Inventors: Jean-Claude Yvin, Saint-Malo (FR); Florence Cruz, Saint-Malo (FR); Mariana Carolina Pereira Vieira Devault, Saint-Malo (FR); Larissa Villar, Saint-Malo (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 0 days.

(21) Appl. No.: 16/771,909

(22) PCT Filed: Dec. 10, 2018

(86) PCT No.: PCT/FR2018/053166
§ 371 (c)(1),
(2) Date: Jun. 11, 2020

(87) PCT Pub. No.: WO2019/115921
PCT Pub. Date: Jun. 20, 2019

(65) Prior Publication Data
US 2021/0070670 A1    Mar. 11, 2021

(30) Foreign Application Priority Data

Dec. 11, 2017 (FR) ..................................... 1761954

(51) Int. Cl.
*C05F 17/20* (2020.01)
*C05F 11/00* (2006.01)
(Continued)

(52) U.S. Cl.
CPC .............. *C05F 17/20* (2020.01); *A01C 21/00* (2013.01); *A01C 21/002* (2013.01); *C05F 11/00* (2013.01); *C05G 1/00* (2013.01)

(58) Field of Classification Search
None
See application file for complete search history.

(56) References Cited

U.S. PATENT DOCUMENTS

| | | | |
|---|---|---|---|
| 2010/0255541 A1* | 10/2010 | Hu .......................... | A01G 33/00 435/71.1 |
| 2013/0104612 A1* | 5/2013 | Erro ........................ | C05F 11/02 71/24 |
| 2016/0264483 A1* | 9/2016 | Mansour ................. | C05F 17/00 |

FOREIGN PATENT DOCUMENTS

| | | | | |
|---|---|---|---|---|
| CN | 105016907 A | * | 11/2015 | ............... C05G 3/00 |
| CN | 106542885 A | * | 3/2017 | ............... C05G 3/00 |

(Continued)

OTHER PUBLICATIONS

Lay et al., "Effect of Spirulina Biofertilizer Suspension on Growth and Yield of *Vigna radiata* (L) Wilczek", Universities Research Journal, vol. 4, No. 1 (2011), pp. 351-363.

(Continued)

*Primary Examiner* — Wayne A Langel
(74) *Attorney, Agent, or Firm* — MH2 Technology Law Group, LLP (57) ABSTRACT

The invention relates to the use of phycobiliproteins or of an extract containing same as fertilizer, a method for stimulating tillering and/or root development and/or the yield of a plant, as well as fertilizer compositions comprising phycobiliproteins or an extract containing same and (i) an amendment and/or (ii) a fertilizer other than phycobiliproteins or an extract containing same.

29 Claims, 4 Drawing Sheets

(51) Int. Cl.
*C05G 1/00* (2006.01)
*A01C 21/00* (2006.01)

(56) References Cited

FOREIGN PATENT DOCUMENTS

| JP | 06016519 A | * | 1/1994 | ............... C05G 1/00 |
| WO | 2016164819 A2 | | 10/2016 | |
| WO | 2016164819 A3 | | 11/2016 | |

OTHER PUBLICATIONS

French Search Report issued in corresponding French Application No. 1761954 dated Aug. 2, 2018, pp. 1-3.
Hussain et al., "Phytostimulation and biofertilization in wheat by cyanobacteria", J. Ind. Microbiol. Biotechnol., vol. 38 (2011) pp. 85-92.
International Search Report issued in corresponding International Application No. PCT/FR2018/053166 dated Mar. 28, 2019, pp. 1-3.
Mogor et al., "Biostimulant properties of cyanobacterial hydrolysate related to polyamines", J. Appl. Phycol., vol. 30 (2018) pp. 453-460.
Sinha et al., "Ultraviolet-B-induced Destruction of Phycobiliproteins in Cyanobacteria", Physiol. Mol. Biol. Plants, vol. 11, No. 2 (2005) pp. 313-319.

* cited by examiner

TILLERING OF WINTER WHEAT

DRY MASS PER PLANT

USE OF PHYCOBILIPROTEINS OR AN EXTRACT CONTAINING SAME AS FERTILIZER

CROSS REFERENCE TO RELATED APPLICATIONS

This application is the National Phase of PCT International Application No. PCT/FR2018/053166, filed on Dec. 10, 2018, which claims priority under 35 U.S.C. 119(a) to Patent Application No. 1761954, filed in FRANCE on Dec. 11, 2017, all of which are hereby expressly incorporated by reference into the present application.

TECHNICAL FIELD

The invention relates to the use of phycobiliproteins or of an extract containing same as fertilizer, a method for stimulating tillering and/or root development and/or the yield of a plant, as well as fertilizer compositions comprising phycobiliproteins or an extract containing same and (i) an amendment and/or (ii) a fertilizer other than phycobiliproteins or an extract containing same.

TECHNOLOGICAL BACKGROUND

Tillering is a property of numerous species of plants of the order of the monocotyledons, notably the Poaceae (grasses), which corresponds to the formation of shoots from a bud near the base of a plant at the level of a zone called the "tillering area". Each shoot is commonly called a "tiller". In general, each tiller will bear an inflorescence.

Tillering is an important agronomic trait that is under genetic and hormonal control and is directly dependent on the environmental conditions. Tillering is notably desirable in the growing of cereals as an increase in the number of tillers is generally correlated with an increase in the number of ears. Stimulation of tillering may therefore have a direct influence on yield.

Tillering is also desirable for lawns in order to ensure the formation of a dense mat of vegetation.

Tillering of cereals is one of the most important phenological stages occurring in the winter months (January-February in Europe), subject to limiting factors, such as poor meteorological conditions (frost, humidity) which make the soil asphyxiated and poorly drained, and a limited intensity of light.

Several factors of varying importance may affect the tillering process, for example:
  The sowing depth. The best sowing depth is considered to be 3-4 cm from the soil surface, the tillering energy being optimal at this depth.
  The size of the seeds. Large seeds have more reserves for nourishing the seedlings and give a start of vegetation that is favorable for satisfactory subsequent tillering.
  The temperature. It is optimal when it is between 12 and 20° C. at the time of tillering. Below 6° C., tillering decreases, and in certain cases it stops.
  The duration and intensity of light. It may depend on the density of plants per square meter.
  The nutrition of the plants. It is an important factor, which it is possible to influence by the use of fertilizers, such as manure.

Moreover, it would seem that an important factor promoting the tillering process is good root development of the plant.

To stimulate tillering of the monocotyledons, many cultivation techniques have been developed such as the use of fertilizers and growth regulators. However, the products used are not always effective for tillering and are not always good for the environment.

There is therefore a need for new fertilizers capable of stimulating tillering and/or root development of a plant.

It is in this context that the applicant has demonstrated, and this constitutes the basis of the present invention, that phycobiliproteins or extracts containing same can be used as fertilizers, notably for stimulating tillering and/or root development and/or the yield of a plant.

SUMMARY OF THE INVENTION

Thus, the present invention, which finds application in the agro-environmental and agricultural sector, aims to propose a new fertilizer for stimulating tillering and/or root development and/or the yield of a plant.

According to a first aspect, the invention relates to the use of phycobiliproteins or of an extract containing same as fertilizer.

According to a second aspect, the invention relates to a method for stimulating tillering and/or root development and/or the yield of a plant, characterized in that it comprises supplying the soil with an effective amount of phycobiliproteins or of an extract containing same.

According to a third aspect, the invention relates to a fertilizer composition comprising phycobiliproteins or an extract containing same and (i) an amendment and/or (ii) a fertilizer other than phycobiliproteins or an extract containing same.

DETAILED DESCRIPTION OF THE INVENTION

The term "extract" refers to the product resulting from extraction from a source. For example, the source may be a biological source, such as cells. In the case of cells, the term "extract" therefore refers to the product resulting from the extraction of the contents of cells. Thus, for example, the term "extract from cyanobacteria" refers to the product resulting from the extraction of the contents of the cells of cyanobacteria.

The terms "extract containing phycobiliproteins" and "phycobiliprotein extract" are interchangeable and refer to an extract obtained from a source of phycobiliproteins. The extract containing phycobiliproteins used in the context of the present invention is preferably an extract from microalgae containing phycobiliproteins, preferably an extract from cyanobacteria, Rhodophyceae, Glaucocystophyceae or Cryptophyceae. An extract from microalgae containing phycobiliproteins according to the invention is therefore the result of extraction in a solvent, for example water, of the phycobiliproteins present in the cells of the microalgae. The dry matter of phycobiliproteins in the extract containing phycobiliproteins is at least 5% of the total weight of dry matter of the extract, for example at least 10%, at least 15%, 20% for example between 5% and 20%, between 10% and 15%. The techniques for extracting the phycobiliproteins are widely described in the literature and are easily carried out by a person skilled in the art, for example aqueous extraction. Extraction techniques used conventionally are presented in detail hereunder. The extract containing phycobiliproteins used in the context of the present invention may be enriched with phycobiliproteins. Thus, the dry matter of phycobiliproteins in a phycobiliprotein-enriched extract may be increased to at least 20% of the total weight of dry matter of the extract, for example at least 25%, at least 30%, 35%, 40%, 50% for example between 20% and 50%, between 25% and 40%, between 25% and 35%, between 25% and 30%. Techniques for phycobiliprotein enrichment are described in the literature and are easily carried out by a person skilled in the art, for example precipitation of the phycobiliproteins by adding ammonium sulfate and optionally ultrafiltration of the precipitated phycobiliproteins, for example on a membrane with a porosity of about 1000 Da.

The term "fertilizer" refers to a substance, or a mixture of substances, natural or of synthetic origin, used in agriculture, in horticulture and in sylviculture, to improve soils, notably their structure, and fertilize the plants being grown. Fertilizers comprise manures and amendments.

The term "manure" refers to fertilizer materials whose main function is to supply plants with elements directly useful for their nutrition (major fertilizing elements, secondary fertilizing elements and trace elements).

The term "amendment" refers to a substance intended to improve the quality of soils, and notably intended to improve the pH of soils. Advantageously, the amendment is selected from basic mineral amendments of the limestone and/or limestone and magnesia type; humus-bearing amendments of the compost or dung type.

The term "stimulation of tillering" corresponds to an increase in the number of tillers of a plant. Stimulation of tillering is generally evaluated by counting the number of tillers per plant.

The phycobiliproteins useful according to the invention are natural water-soluble polymeric proteins. They consist of a proteinaceous part of high molecular weight (called apoprotein) and a chromophore (called bilin) bound covalently to the apoprotein. The chromophore has an open tetrapyrrole ring, responsible for the color. The principal chromophores described in the literature are phycocyanobilin, phycoerythrobilin, phycourobilin and cryptoviolin. Each of them has a specific absorption spectrum modified by the interactions with the apoprotein.

More precisely, the phycobiliproteins consist of two homologous polypeptide chains, α and β, of about 17 and 18 kDa, respectively. Some (the phycoerythrins, see later) contain an additional γ subunit of 30 kDa. The phycobiliproteins may bear various chromophores. The properties due to their chromophore composition, as well as the conformation and the environment of the chromophores in the native protein, have led to the phycobiliproteins being classified as a function of their absorption spectrum.

There are four main types of phycobiliproteins:
allophycocyanin (APC; λmax=650 nm),
phycocyanin (PC; λmax=620 nm),
phycoerythrin (PE; λmax=565 nm), and
phycoerythrocyanin (PEC, λmax=568 nm).

These types of phycobiliproteins may coexist in one and the same species. However, phycoerythrin is dominant in the Rhodophyta whereas phycocyanin is more abundant and sometimes the only one present in the cyanobacteria.

The phycobiliproteins are found in the phycobilisomes in the cyanobacteria, Rhodophyceae and Glaucocystophyceae, as well as free in the lumen of the thylakoids in the Cryptophyceae. Organized in an architecture called phycobilisomes, the phycobiliproteins constitute the accessory pigments of photosynthesis, supplementing chlorophyll. They have a coloring capacity ranging from red to blue.

The phycobiliproteins making up the phycobilisomes are APC and PC. PE is present in most of the red algae and in many cyanobacteria. PEC is present in large amounts in certain cyanobacteria.

The phycobiliproteins represent 85% of the total weight of the phycobilisomes. The remaining "colorless" proteins are binding polypeptides (Tandeau de Marsac and Cohen-Bazire 1977).

The present invention follows from the surprising advantages, demonstrated by the inventors, of the effect of the phycobiliproteins or of an extract containing same on the tillering and/or root development of a plant.

Thus, the invention relates to the use of phycobiliproteins or of an extract containing same as manure, notably for stimulating tillering and/or root development of a plant.

The invention also relates to a method for stimulating tillering and/or root development of a plant, characterized in that it comprises supplying the soil with an effective amount of phycobiliproteins or of an extract containing same.

In a preferred embodiment according to the invention, the plant belongs to the order of the monocotyledons, preferably to the family Poaceae. The inventors have in fact demonstrated that the phycobiliproteins or extracts containing same make it possible to stimulate tillering of monocotyledons, in particular of the family Poaceae. The Poaceae, commonly called the grasses, notably include most of the species commonly called "grasses" and "cereals". The cereals are widely cultivated, mainly for their grains, and are used in food for humans and animals.

Advantageously, the plant is a member of the family Poaceae, preferably selected from wheat, rice, barley, oat, rye, sugar cane, pasture plants or maize, preferably wheat.

The phycobiliproteins or the phycobiliprotein extracts are commonly obtained from algae, in particular from microalgae containing phycobiliproteins, in particular from cyanobacteria, Rhodophyceae, Glaucocystophyceae or Cryptophyceae.

In a particular embodiment, the phycobiliprotein extract is an extract from cyanobacteria, an extract from Rhodophyceae, an extract from Glaucocystophyceae or an extract from Cryptophyceae. Advantageously, the phycobiliprotein extract is an extract from cyanobacteria, preferably an extract from cyanobacteria of the genus *Arthrospira*, preferably *Arthrospira platensis*.

Preparation of a phycobiliprotein extract does not present any particular difficulty, and numerous methods of extraction are described in the literature. The method of extraction is not limited to a particular method, and the classical methods may be employed for preparing a phycobiliprotein extract, for example such as aqueous extraction.

The phycobiliprotein extracts may be obtained by a method comprising the following steps: mixing the dry microalgae with water, extraction (solid-liquid separation) and optionally fractionation and/or concentration.

In a particular embodiment, the phycobiliprotein extract is a macerated product of microalgae. In this embodiment, the phycobiliprotein extract is obtained by aqueous maceration by mixing the previously dried microalgae (dry algae) with water at a suitable temperature and for a suitable time. For example, the dry microalgae are mixed with water at room temperature for 3 hours, and the mixture is then centrifuged to recover the liquid fraction therefrom. The liquid fraction may be used as such as phycobiliprotein extract or may undergo one or more further treatments, for example such as filtration and/or precipitation. In particular, precipitation makes it possible to enrich the extract with phycobiliproteins.

The phycobiliprotein extract may have a varying concentration of phycobiliproteins depending on the use envisaged. For example, the dry matter of phycobiliproteins in the extract containing phycobiliproteins is at least 5% of the total weight of dry matter of the extract, for example at least 10%, at least 15%, 20% for example between 5% and 20%, between 10% and 15%. The extract containing phycobiliproteins used in the context of the present invention may be enriched with phycobiliproteins. Thus, the dry matter of phycobiliproteins in the extract containing phycobiliproteins may be increased to at least 20% of the total weight of dry matter of the extract, for example at least 25%, at least 30%, 35%, 40%, 50% for example between 20% and 50%, between 25% and 40%, between 25% and 35%, between 25% and 30%.

The nature of the enrichment techniques may vary. For example, it is possible to use the techniques of dialysis, ultrafiltration, differential precipitation, for example dialysis at 1000 daltons, ultrafiltration at 1000 daltons and/or precipitation with ammonium sulfate.

The phycobiliproteins or the extract containing same may be supplied to the soil in liquid form or in solid form. In solid form, the phycobiliproteins or the extract containing same may be dehydrated for a presentation in the form of water-soluble dry powder, for example by means of a drum dryer, by spraying or by lyophilization. In liquid form, the phycobiliproteins or the extract containing same may have a varying concentration of phycobiliproteins depending on the use envisaged.

The phycobiliproteins or the extract containing same make it possible to increase tillering, thus responding to the growth needs of the crop which will notably be expressed in terms of improved yield. It has also been demonstrated that the phycobiliproteins or the extract containing same make it possible to stimulate a plant's root development.

Advantageously, application to the plants will be carried out via the leaves or via the roots.

The phycobiliproteins or an extract containing same are preferably supplied to the soil in an effective amount of phycobiliproteins, for example in an amount of phycobiliproteins from 0.1 to 5 kg/ha, preferably from 0.2 to 3 kg/ha, preferably in an amount of about 1 kg/ha.

"Effective amount" means an amount sufficient to increase tillering by at least 5%, advantageously by at least 10%, for example by at least 15%, at least 20%, at least 25%, at least 30%, at least 35%, at least 40%, advantageously by at least 30%. Thus, in a particular embodiment, the phycobiliproteins or an extract containing same are supplied to the soil in an amount sufficient to increase tillering by at least 5%, advantageously by at least 10%, for example by at least 15%, at least 20%, at least 25%, at least 30%, at least 35%, at least 40%, advantageously by at least 30%.

The phycobiliproteins or an extract containing same may be used as a supplement in fertilizer compositions, such as manure, to stimulate tillering and/or root development and/or the yield of a plant. Such compositions make it possible to respond best to the growth needs of the plant, which will notably be expressed in terms of improved yield.

Thus, the invention also relates to a fertilizer composition comprising phycobiliproteins or an extract containing same and (i) an amendment and/or (ii) a fertilizer other than phycobiliproteins or an extract containing same.

As examples of fertilizers that may be used in the composition according to the invention, we may mention limestone amendments, organic amendments and growth substrates, root fertilizers of the type NP, PK, NPK, etc., fertilizers and/or foliar biostimulants or else nutrient solutions for the roots.

In a particular embodiment, the fertilizer is one or more substances selected from urea, ammonium sulfate, ammonium nitrate, phosphate, potassium chloride, magnesium nitrate, manganese nitrate, zinc nitrate, copper nitrate, phosphoric acid, potassium nitrate and boric acid.

The present invention is illustrated by the following nonlimiting examples.

DESCRIPTION OF THE FIGURES

The letters "a", "b" and "c" correspond to ANOVA analysis of variance: "a", "b" and "c" refer to different statistical groups at 5% and the groups "ab" and "bc" signify that the set of conditions is not different from the control, nor from the other set of conditions.

FIG. 3a shows that for one and the same number of leaves, treatment with FLM17 increases the number of tillers.

FIG. 3b shows notably that tillering is earlier and more significant with supply of the "FLM17" extract at different concentrations in the hydroponic solution, i.e. 350 μl/L (middle bars) and 700 μl/L (bars on the right) compared to tillering without supply of the "FLM17" extract (bars on the left).

The letters "a", "b" and "c" correspond to ANOVA analysis of variance: "a", "b" and "c" denote different statistical groups at 5% and the groups "ab" and "bc" signify that the set of conditions is not different from the control, nor from the other set of conditions.

The letters "a", "b" and "c" correspond to ANOVA analysis of variance: "a", "b" and "c" refer to different statistical groups at 5% and the groups "ab" and "bc" signify that the set of conditions is not different from the control, nor from the other set of conditions.

EXAMPLES

Example 1: Preparation of an Extract Containing Phycobiliproteins 100 g of microalgae of the type *Arthrospira platensis* were incorporated in 0.9 liters of demineralized water. The mixture was then stirred at room temperature for about 3 h. Then the mixture obtained was centrifuged at 7000 revolutions/min for 30 minutes. This step allowed the phycobiliproteins present in the cells of the microalgae to be extracted in the water. The phycobiliproteins were then present in the supernatant. The supernatant was then recovered and filtered at 50 µm. The filtrate thus obtained, corresponding to an extract containing phycobiliproteins, comprised between 6 and 8 wt % of dry extract.

The amount of phycobiliproteins in the extracts was measured by the reference spectrophotometric method described in Bennett et al. (The Journal of Cell Biology, Volume 58, p. 419-435, 1973). The extracts obtained by the method described above were titrated between 5 and 8 g of phycobiliproteins per liter of extract. This corresponds to a content of phycobiliproteins equivalent to 10% of the dry matter contained in the extract, i.e. the dry mass of phycobiliproteins in the extract is 10% of the total weight of dry matter of the extract.

An extract containing 7 g of phycobiliproteins/liter was designated "FLM17".

An alternative method consists of incorporating 100 g of microalgae of the type *Arthrospira platensis* in 0.9 liters of demineralized water buffered with 5% phosphate buffer. The mixture is then stirred at a temperature of 4° C. for about 24 h. Then the mixture obtained is centrifuged at 4000 g for 30 minutes. This step allows the phycobiliproteins present in the cells of the microalgae to be extracted in water. The phycobiliproteins are contained in the supernatant. The supernatant is then recovered and filtered at 50 µm.

Example 2: Preparation of a Phycobiliprotein-Enriched Extract

Starting with 500 mL of the FLM17 extract obtained in Example 1, the phycobiliproteins were precipitated by adding ammonium sulfate at a dose of 500 g/L of filtrate. Precipitation occurred after stirring the mixture for 2 hours at +4° C.

The precipitate was recovered by centrifugation for 30 minutes at 7000 rpm at +4° C.

The precipitation pellet was taken up in 500 mL of demineralized water, then membrane ultrafiltration to constant volume was carried out on a ceramic membrane with a porosity of 1000 daltons, in order to remove the salts, to obtain a phycobiliprotein-enriched extract. Ultrafiltration also made it possible to remove small molecules with a molecular weight below 1000 daltons, notably phytohormones, such as phytohormones known by the name Auxin (IAA=indoleacetic acid: MW=175 Da), Zeatin (trans and cis: MW=219.2 Da) and Zeatin riboside (MW=351.3 Da). This phycobiliprotein-enriched extract was enriched with phycobiliproteins 2.5 times relative to the starting FLM17 extract, i.e. a content of phycobiliproteins of 17.5 g/L of enriched extract. This corresponds to a content of phycobiliproteins equivalent to 25% of the dry matter contained in the enriched extract, i.e. the dry mass (or weight) of phycobiliproteins in the extract is 25% of the total weight of dry matter of the extract.

This phycobiliprotein-enriched extract was designated "FLM17 B".

Example 3: Agronomic Effect of the Phycobiliprotein Extract FLM17 Obtained in Example 1, on the Tillering Stage of a Winter Soft Wheat in Controlled Conditions Materials and Methods Seeds of winter soft wheat (*Triticum aestivum*), cv. Rubisko, were sown in opaque black boxes containing vermiculite. Immediately after sowing, the substrate was watered with water and the boxes were kept away from the light for 2 days. The seedlings were then moved and kept in a growing chamber for 5 days until the time for transplanting.

On the seventh day after sowing (BBCH 11-12), the roots of the seedlings were cleaned and the seedlings were planted out in opaque pots with a capacity of 5 liters, at a rate of 3 plants per pot. A hose with a diameter of about 7 mm connected to a pump was introduced into each pot in order to ensure constant aeration of the nutrient solution in contact with the roots. These pots were kept in the same growing chamber throughout the test.

The nutrient solution was prepared according to the classical Hoagland recipe, adapted to the needs of the crop. Renewal of this solution for all the pots, as well as supply of the "FLM17" extract to the roots by the liquid route in the treatment conditions (Table 1), took place every 2 days.

TABLE 1

Test conditions in the hydroponics test on winter soft wheat.

| Conditions | Characterization of the conditions |
| --- | --- |
| 1 | Hoagland solution (untreated control) |
| 2 | Hoagland solution + 350 µl of FLM17/liter of Hoagland solution (corresponding to 2.45 mg of phycobiliproteins/liter of Hoagland solution) |
| 3 | Hoagland solution + 700 µl of FLM17/liter of Hoagland solution (corresponding to 4.9 mg of phycobiliproteins/liter of Hoagland solution) |

Each set of conditions tested comprised 3 repetitions (buckets) in which 3 plants were put, totalling 12 plants per set of conditions.

At 29 days post-transplanting (and therefore of treatment), the plants were harvested. The average number of tillers per plant as well as the aerial and root biomass were quantified.

Results

Tillering

Figure 1:
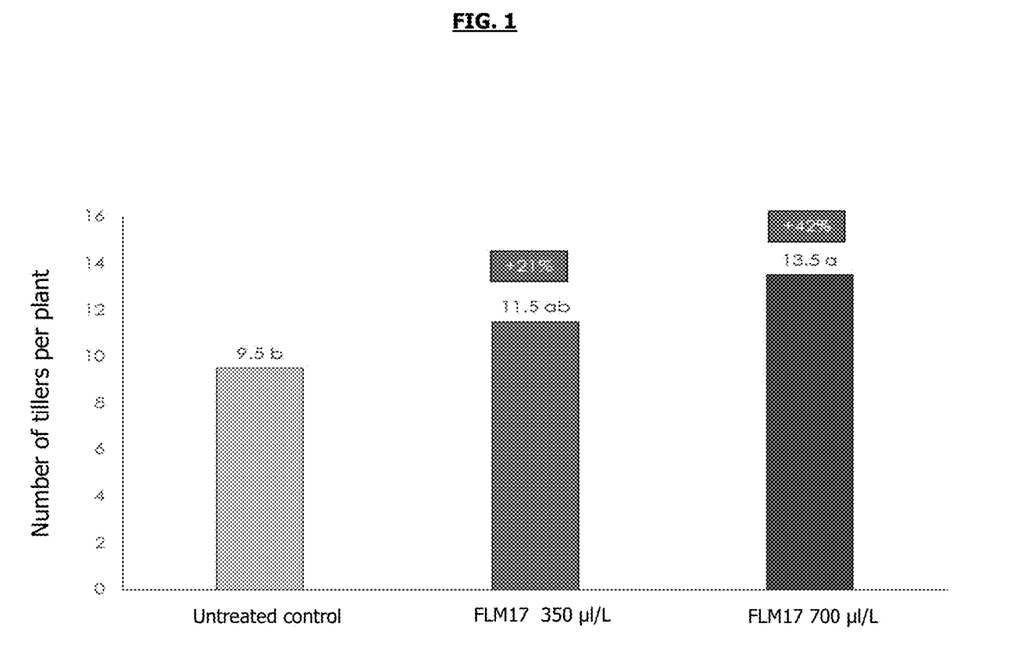
FIG. 1: Diagram showing the number of tillers per plant of soft wheat after 29 days of supplying the "FLM17" extract at different concentrations in the hydroponic solution, i.e. 350 μl/L and 700 μl/L (and without supply of the "FLM17" extract (untreated control). The "FLM17" extract, at the two concentrations tested, makes it possible to stimulate tillering.

Independently of the dose tested, the "FLM17" extract promoted an increase in the average number of tillers per plant, relative to the plants in the untreated control group. With a 42% increase in the number of tillers per plant, the plants treated at 700 µl of FLM17/liter of Hoagland solution showed average tillering significantly (ANOVA at the threshold=5%) greater than the untreated control (FIG. 1).

Production of Dry Biomass

Figure 2:
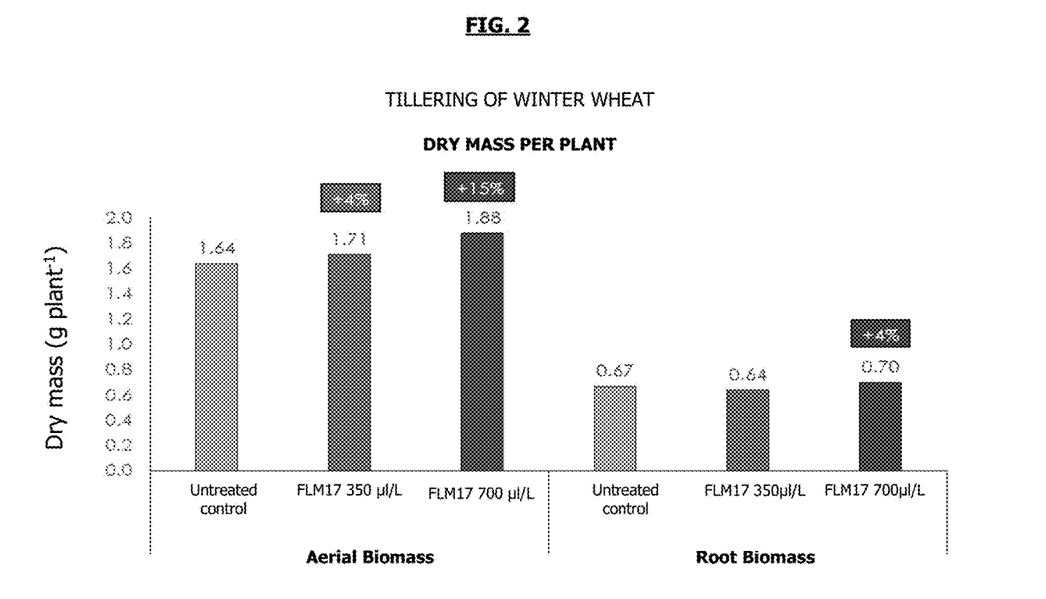
FIG. 2: Diagrams showing the dry aerial and root biomasses produced by plants of soft wheat after 29 days of supplying the "FLM17" extract at different concentrations in the hydroponic solution, i.e. 350 μl/L and 700 μl/L and without supply of the "FLM17" extract (untreated control). The "FLM17" extract, at the two concentrations tested, stimulates root and aerial development.

An average gain in the production of aerial and root biomass of the order of 15% and 4% was observed for the plants that had been treated with the "FLM17" extract at 700 µL/liter of Hoagland solution, respectively (FIG. 2). This converges and can be explained by the increase in the number of tillers.

The FLM17 extract obtained in Example 1 causes a stimulation of tillering of the winter wheat by an increase in the number of tillers and an increase in total biomass.

Example 4: Agronomic Effect of the Phycobiliprotein Extract FLM17 Obtained in Example 1, on the Tillering Stage of a Winter Soft Wheat in Controlled Conditions Materials and Methods Experimental Setup Seeds of winter soft wheat (*Triticum aestivum*), cv. Rubisko, were sown in opaque black boxes containing vermiculite. Immediately after sowing, the substrate was watered and the boxes were kept away from the light for 2 days. The seedlings were then moved and kept in a growing chamber for 5 days until the time for transplanting.

On the seventh day after sowing (BBCH 11-12), the roots of the seedlings were cleaned and the seedlings were planted out in opaque pots with a capacity of 5 liters, at a rate of 6 plants per pot. A hose with a diameter of about 7 mm connected to a pump was introduced into each pot in order to ensure constant aeration of the nutrient solution in contact with the roots. These pots were kept in a greenhouse in the following conditions:

TABLE 2

Greenhouse conditions during the test

| Temperature | 28° C. in the daytime and 21° C. at night |
|---|---|
| Relative humidity | 70%-80% RH |
| Photoperiod | 16 hours of light and 8 hours of darkness |

The nutrient solution was prepared in situ according to the classical Hoagland recipe, adapted to the needs of the crop. Renewal of this solution for all the pots, as well as supply of the "FLM17" extract to the roots by the liquid route in the treatment conditions (Table 3) took place 3 times per week.

TABLE 3

Test conditions in the hydroponics test on winter soft wheat

| Conditions | Characterization of the conditions |
|---|---|
| 1 | Hoagland solution (untreated control or TNT) |
| 2 | Hoagland solution + 350 µl of FLM17/liter of Hoagland solution (corresponding to 2.45 mg of phycobiliproteins/liter of Hoagland solution) |
| 3 | Hoagland solution + 700 µl of FLM17/liter of Hoagland solution (corresponding to 4.9 mg of phycobiliproteins/liter of Hoagland solution) |

Each set of conditions tested comprised 8 repetitions (buckets) in which 6 plants were introduced, totalizing 48 plants per set of conditions.

Starting from 14 days of treatment in hydroponics (21 days post-sowing, i.e. 21 DPS), counting of the number of leaves per plant, of the total number of plants with tillering in each set of conditions as well as of the number of tillers per plant was begun. It was thus possible to establish the dynamics of tillering. Two separate harvests were carried out in the context of this test:

1. Intermediate harvesting at 28 DPS, and
2. Final harvesting at 51 DPS.

At intermediate harvesting, 12 plants from each set of conditions were harvested, packaged and immersed in liquid nitrogen before being stored frozen at −80° C. The second half of the plants was harvested, packaged and put in an oven to dry, at 70° C.

The following parameters were studied during intermediate harvesting:

Root morphology using an acquisition tool (EPSON Expression 10000 XL scanner, Japan) and image processing (Winrhizo™, Canada);

Aerial and root dry mass.

At final harvesting, 8 plants from each set of conditions were harvested, packaged and immersed in liquid nitrogen before being stored frozen at −80° C. The remaining 16 plants from each set of conditions were collected, packaged and put in an oven to dry, at 70° C.

During final harvesting, the aerial and root dry mass was measured.

Statistical analysis of the data collected for this test was carried out using the R Studio software. The alpha threshold employed in the analyses of variance (ANOVA) and the post-hoc tests (Student-Newman-Keuls, SNK) was 5%.

Results

Intermediate Harvesting

Dynamics of Tillering

Figure 3:
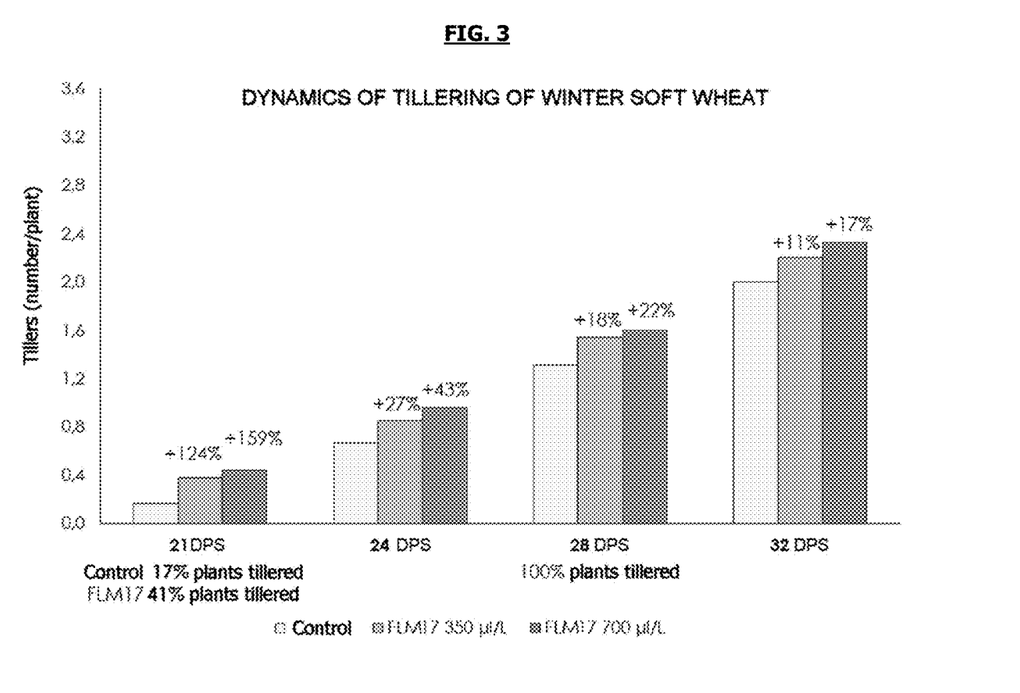
FIG. 3: Diagrams showing the dynamics of tillering with and without the "FLM17" extract established with:
  variation of the number of leaves per plant between 21 DPS (days post-sowing) and 32 DPS (FIG. 3a), and
  variation of the number of tillers between 21 DPS and 32 DPS (FIG. 3b).

The average number of tillers per plant in the various treatment conditions was greater overall than that of the untreated control starting from the first count, where 41% of the treated plants had tillered (both doses combined) against only 17% for the untreated control (FIG. 3). This difference was maintained until the last count, which took place on the day before intermediate harvesting.

This precocity may be beneficial as these structures have more time before the end of the tillering stage to become independent of the main stem, i.e. to establish roots for their subsistence.

Root Development

The density of the nodal roots (or "crown roots") in the vegetative stage is strongly correlated with the number of tillers developed by certain cereals because they are important for physical and nutritional support of the plants. The seminal roots are also associated with absorption of nutrients and water, contributing directly to the overall nutrition of the plants (NAKHFOROOSH et al., *Wheat root diversity and* root functional characterization, 2014; ROGERS & BENFEY, Regulation of plant root system architecture: implications for crop advancement, 2015).

Although the appearance and the branching of the seminal roots, called embryonic, are highly dependent on the genetics of the plant in question, those of the nodal roots, called post-embryonic, evolve as a function of the surrounding conditions (KUHHAM and BARRACLOUGH, Comparison between the seminal and nodal root systems of winter wheat in their activity for N and K uptake, 1986).

Figure 4:
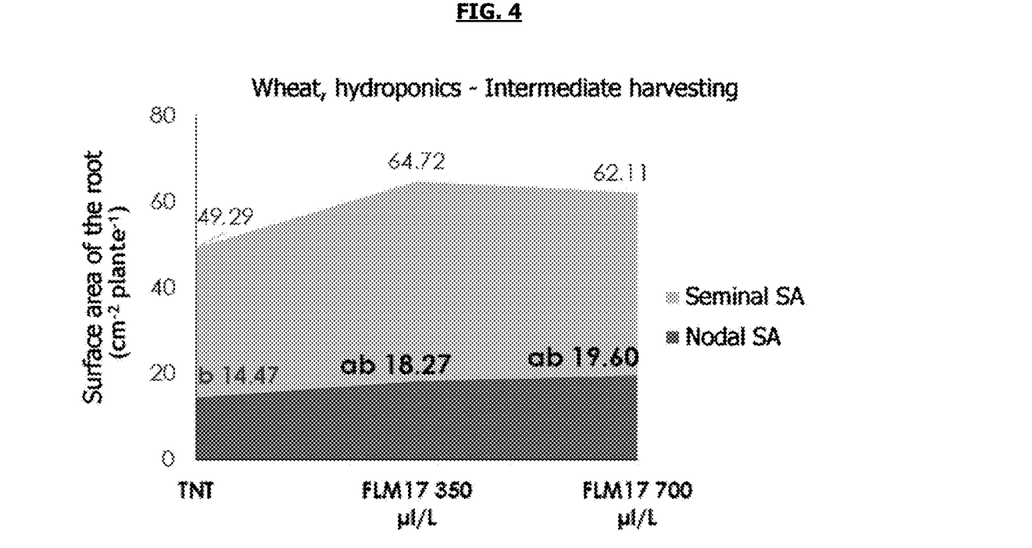
FIG. 4: Diagram illustrating the morphology of the root system of the plants of soft wheat harvested after 28 days post-sowing (DPS), i.e. supplying the "FLM17" extract for 20 days. The diagram notably shows an increase in the area of the seminal roots and nodal roots with supply of the "FLM17" extract at different concentrations in the hydroponic solution, i.e. 350 μl/L and 700 μl/L compared to the area obtained without supply of the "FLM17" extract (TNT).

FIG. 4 shows that the "FLM17" extract stimulates root development, of the nodal roots in particular.

Final Harvesting

Dynamics of Tillering

Figure 5:
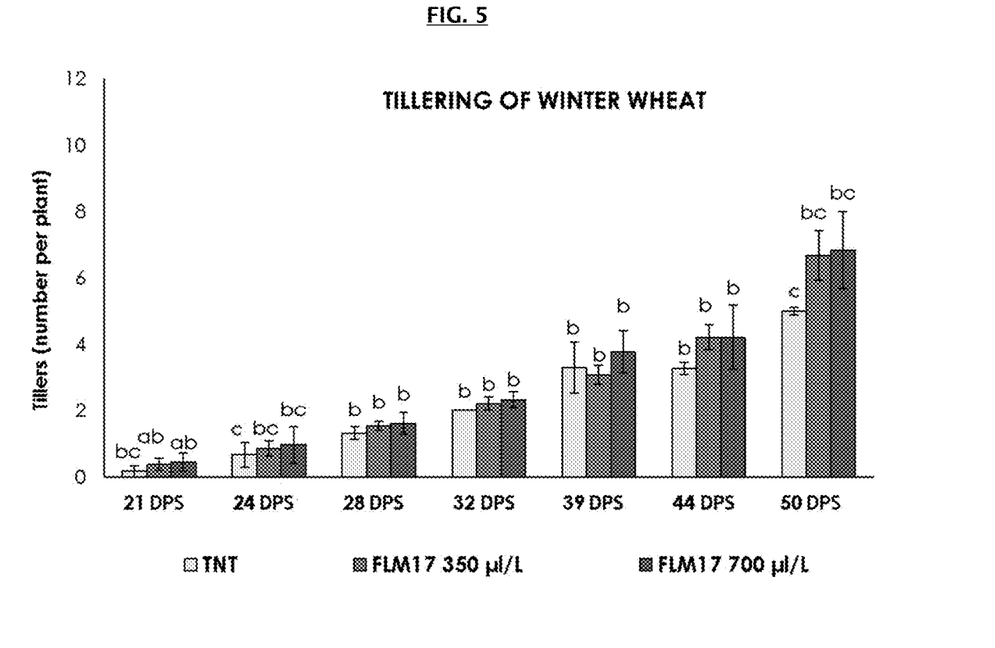
FIG. 5: Diagram showing the variation of the number of tillers per plant of soft wheat until 43 days of supplying the "FLM17" extract (50 DPS) at different concentrations in the hydroponic solution, i.e. 350 μl/L (middle bars) and 700 μl/L (bars on the right). The "FLM17" extract, at the two concentrations tested, stimulates tillering throughout the development of the plant. The stimulation is even more marked at 50 DPS.

Appearance of new tillers was monitored until the day before the final harvesting, i.e. 50 DPS. Stimulation of tillering with "FLM17" was maintained throughout the treatment (FIG. 5).

Production of Dry Biomass

Figure 6:
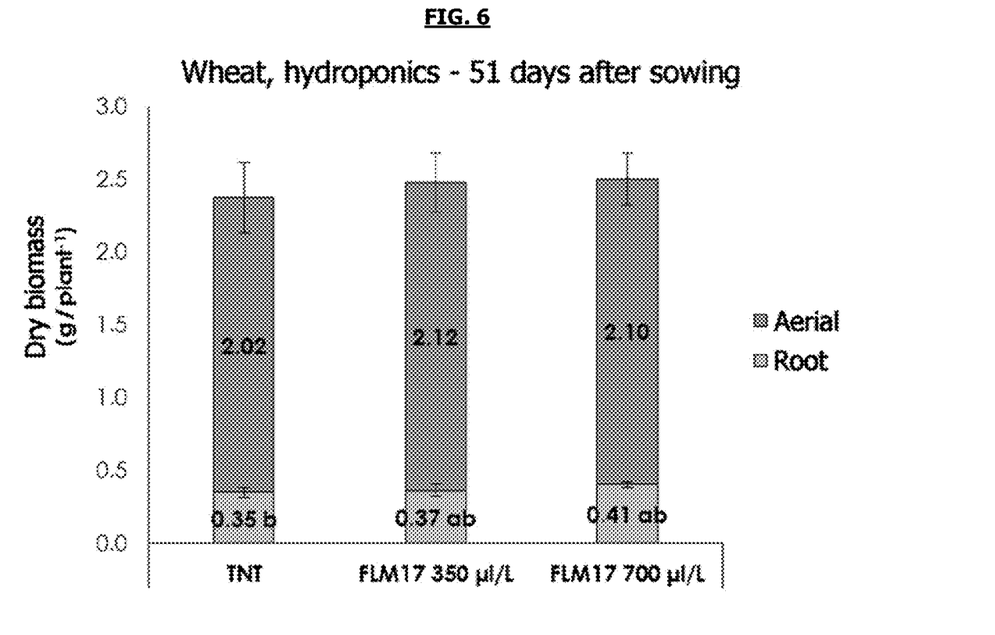
FIG. 6: Diagram showing the dry biomass of the plants treated with the "FLM17" extract and untreated (TNT) at 51 DPS.

A slight increase in dry mass produced by the plants at 51 DPS (final harvesting) was measured (FIG. 6).

In conclusion, the FLM17 extract obtained in Example 1 causes stimulation of tillering of the winter wheat by an increase in the number of tillers, acceleration of the dynamics of tillering and an increase in total biomass.

Example 5: Comparison of the Agronomic Effect of the Phycobiliprotein Extract FLM17 Obtained in Example 1 and the Agronomic Effect of the Phycobiliprotein-Enriched Extract FLM17 B Obtained in Example 2, on the Tillering Stage of a Winter Soft Wheat in Controlled Conditions Materials and Methods Seeds of winter soft wheat (*Triticum aestivum*), cv. Rubisko, were sown in opaque black boxes containing vermiculite. Immediately after sowing, the substrate was watered with water and the boxes were kept away from the light for 2 days. The seedlings were then moved and kept in a growing chamber for 5 days until the time for transplanting.

On the seventh day after sowing (BBCH 11-12), the roots of the seedlings were cleaned and the seedlings were planted out in opaque pots with a capacity of 5 liters, at a rate of 3 plants per pot. A hose with a diameter of about 7 mm connected to a pump was introduced into each pot in order to ensure constant aeration of the nutrient solution in contact with the roots. These pots were kept in the same growing chamber throughout the test.

The nutrient solution was prepared according to the classical Hoagland recipe, adapted to the needs of the crop. Renewal of this solution for all the pots, as well as supply of the extracts "FLM17" and "FLM17 B" to the roots by the liquid route in the treatment conditions (Table 4) took place every 2 days.

TABLE 4

Test conditions in the hydroponics test on winter soft wheat

| Conditions | Characterization of the conditions | Dose in μl/ liter of Hoagland solution | Content of phycobiliproteins/L Hoagland solution |
| --- | --- | --- | --- |
| 1 | Hoagland solution (untreated control) | 0 | 0 |
| 2 | Hoagland solution + | 1400 μl | 9 mg |

TABLE 4-continued

Test conditions in the hydroponics test on winter soft wheat

| Conditions | Characterization of the conditions | Dose in μl/ liter of Hoagland solution | Content of phycobiliproteins/L Hoagland solution |
| --- | --- | --- | --- |
| 3 | 1400 μl of FLM17/Liter of Hoagland solution Hoagland solution + 1400 μl of FLM17B/Liter of Hoagland solution | 1400 μl | 22.5 mg |

Each set of conditions tested comprised 3 repetitions (buckets) in which 3 plants were put, totalling 12 plants per set of conditions.

At 29 days post-transplanting (and therefore of treatment), the plants were harvested. The average number of tillers per plant as well as the aerial and root biomass were quantified.

Results

Tillering

Figure 7:
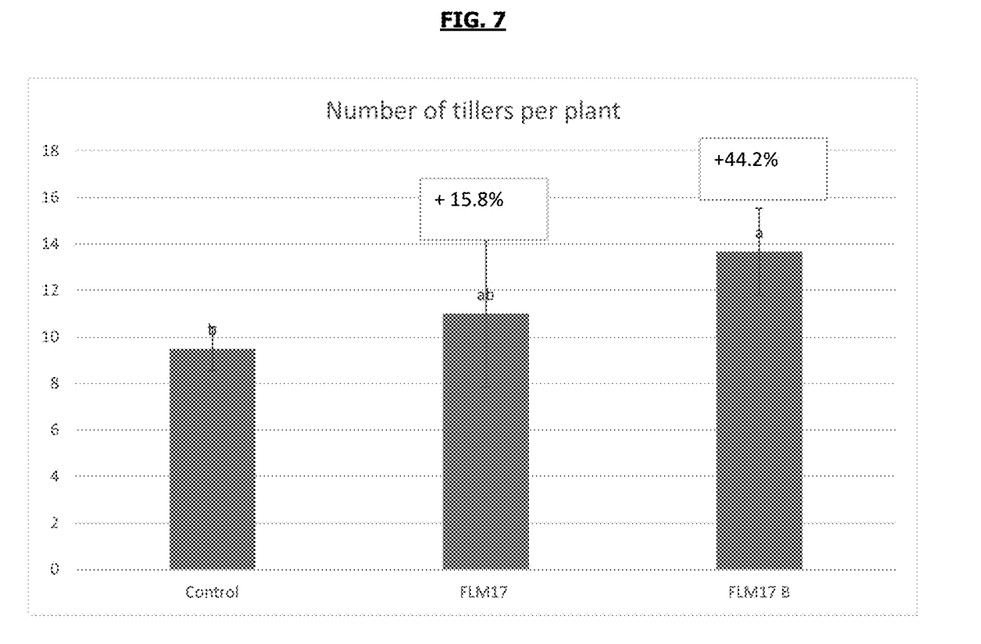
FIG. 7: Diagram showing the number of tillers per plant of soft wheat after 29 days of supplying the "FLM17" extract at a concentration of 1400 µl/L in the hydroponic solution, with supply of the extract "FLM17 B" at a concentration of 1400 µl/L in the hydroponic solution and without supply of the "FLM17" extract (untreated control). The diagram demonstrates that phycobiliprotein enrichment of the FLM17 extract improves the tillering of the wheat considerably.

The "FLM17" extract promoted an increase in the average number of tillers per plant, relative to the plants in the untreated control group. With a 44% increase in the number of tillers per plant, the plants treated with the FLM17 B extract showed tillering significantly (ANOVA at the threshold•=5%) greater than the untreated control and tillering 2.8 times greater relative to the FLM17 extract (FIG. 7).

These results show that phycobiliprotein enrichment improves the tillering of the wheat considerably.

The invention claimed is:

1. A method for fertilizing a plant, comprising application to a soil containing the plant an effective amount of an extract containing phycobiliproteins, in which the extract containing phycobiliproteins is a phycobiliprotein-enriched extract, the dry mass of phycobiliproteins in the extract being at least 10% of the total weight of dry matter of the extract, thereby stimulating tillering and root development of the plant.

2. The method as claimed in claim 1, for stimulating the yield of the plant.

3. The method as claimed in claim 1, in which the plant belongs to the order of the monocotyledons.

4. The method as claimed in claim 1, in which the extract containing phycobiliproteins is an extract from cyanobacteria, an extract from Rhodophyceae, an extract from Glaucocystophyceae or an extract from Cryptophyceae.

5. The method as claimed in claim 1, in which the extract is an extract from cyanobacteria.

6. The method as claimed in claim 1, in which the extract containing phycobiliproteins is supplied to the soil in an amount sufficient to increase tillering by at least 5%.

7. The method as claimed in claim 1, in which the extract containing phycobiliproteins is supplied to the soil in an amount of phycobiliproteins from 0.1 to 5 kg/ha.

8. The method as claimed in claim 1, in which the plant belongs to the family Poaceae.

9. The method as claimed in claim 1, in which the plant is selected from the group consisting of wheat, rice, barley, oat, rye, sugar cane, pasture plants and maize.

10. The method as claimed in claim 1, in which the extract is an extract from cyanobacteria of the genus *Arthrospira*.

11. The method as claimed in claim 1, in which the extract is an extract from cyanobacteria of the genus *Arthrospira platensis*.

12. The method as claimed in claim 1, in which the phycobiliproteins or the extract containing same are supplied to the soil in an amount sufficient to increase tillering by at least 10%, at least 15%, at least 20%, at least 25%, at least 30%, or at least 40%.

13. The method as claimed in claim 1, in which the extract containing phycobiliproteins is supplied to the soil in an amount of phycobiliproteins from 0.2 to 3 kg/ha.

14. The method as claimed in claim 1, in which the extract containing phycobiliproteins is supplied to the soil in an amount of phycobiliproteins about 1 kg/ha.

15. A method for stimulating tillering and root development of a plant, comprising supplying an effective amount of an extract containing phycobiliproteins to a soil comprising the plant, in which the extract containing phycobiliproteins is a phycobiliprotein-enriched extract, the dry mass of phycobiliproteins in the extract being at least 10% of the total weight of dry matter of the extract, thereby stimulating tillering and root development of the plant.

16. The method as claimed in claim 15, in which the plant belongs to the order of the monocotyledons.

17. The method as claimed in claim 15, in which the extract containing phycobiliproteins is an extract from cyanobacteria, an extract from Rhodophyceae or an extract from Glaucocystophyceae.

18. The method as claimed in claim 15, in which the extract containing phycobiliproteins is supplied to the soil in an amount sufficient to increase tillering by at least 5%.

19. The method as claimed in claim 15, in which the extract containing phycobiliproteins is supplied to the soil in an amount of phycobiliproteins from 0.1 to 5 kg/ha.

20. The method as claimed in claim 15, in which the plant belongs to the family Poaceae.

21. The method as claimed in claim 15, in which the plant is selected from the group consisting of wheat, rice, barley, oat, rye, sugar cane, pasture plants and maize.

22. The method as claimed in claim 15, in which the extract is an extract from cyanobacteria of the genus *Arthrospira*.

23. The method as claimed in claim 15, in which the extract is an extract from cyanobacteria of the genus *Arthrospira platensis*.

24. The method as claimed in claim 15, in which the extract containing phycobiliproteins is supplied to the soil in an amount sufficient to increase tillering by at least 10%, at least 15%, at least 20%, at least 25%, at least 30%, or at least 40%.

25. The method as claimed in claim 15, in which the extract containing phycobiliproteins is supplied to the soil in an amount of phycobiliproteins from 0.2 to 3 kg/ha.

26. The method as claimed in claim 15, in which the extract containing phycobiliproteins is supplied to the soil in an amount of phycobiliproteins about 1 kg/ha.

27. A fertilizer composition comprising an extract containing phycobiliproteins and (i) an amendment and/or (ii) a fertilizer other than phycobiliproteins or an extract containing same, in which the extract containing phycobiliproteins is a phycobiliprotein-enriched extract, the dry mass of phycobiliproteins in the extract being at least 10% of the total weight of dry matter of the extract.

28. The fertilizer composition as claimed in claim 27, in which the amendment is selected from the group consisting of: limestone, limestone and magnesia, compost, and dung.

29. The fertilizer composition as claimed in claim 27, in which the fertilizer is selected from the group consisting of: urea, ammonium sulfate, ammonium nitrate, phosphate, potassium chloride, ammonium sulfate, magnesium nitrate, manganese nitrate, zinc nitrate, copper nitrate, phosphoric acid, potassium nitrate and boric acid.

* * * * *